UNITED STATES PATENT OFFICE 2,234,191

PLASTICIZER

Frederick Wilhelm Alex Olze, East Rutherford, N. J., assignor to A. C. Horn Company, Long Island City, N. Y.

No Drawing. Application July 14, 1938, Serial No. 219,161

12 Claims. (Cl. 106—27)

The present invention relates to improving the working properties of mortars and other cementitious materials.

With presently used mortars a great amount of water must be added to obtain sufficient workability. The water must be added in greater amount than would be necessary to hydrate the cement.

A part of this large amount of water tends to separate quite readily. If the mortar is placed on a porous article such as a brick, a certain amount of water is absorbed and consequently the mortar decreases in workability, particularly near the surface of the brick. In such a case when the bricklayer or workman goes over the mortar with a trowel, he is not able to form a smooth layer of mortar penetrating into the irregularities of the brick. As a result the bond between the mortar and the brick is not wholly satisfactory and the interface between the brick and mortar is weak.

Furthermore, if much water is sucked out by the porous brick or ceramic material, the cement will not hydrate properly at the portions thereof near the brick, and the layer of mortar adjacent the brick will erode quite quickly and produce what is known as "shrinking cracks."

The object of the present invention is to provide an improved mortar or cementitious mixture which will retain its water content and therefore its workability to a much higher degree than hitherto thought possible.

Another object is to provide a mortar or cementitious mixture which may be used in connection with porous articles, such as bricks, to form a better bond therebetween.

A further object is to provide a mortar or cementitious mixture which will have improved compressive strength.

A further object of the present invention is to produce hydraulic cement of high flow and water-retaining properties for uses in connections where there is a tendency for a water to be absorbed from the cement and the cement to decrease in flowability or become devoid of desired flowable properties.

Other objects will be obvious or will appear during the course of the following specification.

These objects are attained by the use in very small amounts, of agents which may be described as plasticizing agents in the wet state and which will allow decrease in the proportion of water hitherto necessary to get sufficient workability.

The preferred agents are caramel and secondary licorice root extract in powder or liquid form. Less preferably humic acids, and similar agents may be used. Surprisingly a very small amount of these agents enables the elimination of a relatively large amount of water.

For example with the addition of 0.1 to 0.25% of caramel based upon the amount of cement in a 1:1:6 mortar, it is possible to reduce the water by as much as 18 to 22% with improved workability. The caramel may be produced in various manners.

As one method of production 50 pounds of sucrose may be melted and to this melted mixture may be added 2 pounds of caustic potash. Or 1 pound of sugar may be heated for thirty minutes at about 400 to 410° F. and 4% of caustic potash added, dissolved in 50 cc of water with the stirring continued until the sweet taste is gone completely. The caramel which remains weighs about 80% of the original amount of sugar which was utilized and this may be dissolved up in water to form a 50% solution which can then be added to the cementitious mixtures.

Since the caramel tends to increase the time of set, it is generally desirable to add to cement mixture mixtures a set-corrective, such as calcium chloride, which will decrease the time of set.

Finely divided inert non-hydraulic materials may be added to the mixture. One preferred material is a whiting which has been ground with rosin, stearic acid or other acidic organic or oleaginous materials. This grinding process will form a water insoluble soap film on the surface of whiting, or other mineral material which may be utilized.

The proportions in which these materials may be utilized in the final composition may be widely varied.

For example a composition to be added to a 1:1:6 cement mixture of cement, lime and sand, in the amount of from ½ to 1% figured on the weight of the cement, may consist of 480 pounds of a treated whiting which has been ground as above stated with rosin or other resinous or fatty materials, 66 gallons of water, 60 pounds of a 50% solution of caramel and 120 pounds of calcium chloride.

These proportions may be widely varied and it is possible to utilize from 100 to 1000 pounds of the whiting, from 10 to 100 gallons of water, from 10 to 100 pounds of caramel and from 10 to 200 pounds of calcium chloride, depending upon the exact conditions which are to be obtained. In place of the whiting, caramel and calcium chloride, the other suitable substances may be employed.

Instead of calcium chloride,—magnesium chloride, aluminum chloride, sodium hydroxide, sodium silicate, potassium chloride and other water soluble metallic salts and alkalies may be employed.

Instead of or in addition to whiting, it is also possible to add finely divided materials, such as lithopone, barytes, various silicates, clays and insoluble pulverized powdered or pulverulent minerals, or inorganic or organic materials.

These materials may have been ground in the ball mill with rosin, stearic acid or other high molecular weight fatty acid materials or their derivatives.

As a general rule the preferred proportion is about 400 to 600 pounds of whiting for every 40 to 100 pounds of caramel, but if the whiting is decreased the caramel may be increased, while if the whiting is increased the caramel may be decreased.

In using the composition above, containing the caramel or other high molecular weight substance, and also containing, if desired, a set-corrective salt, such as calcium chloride, a filler, such as whiting in treated or untreated condition and water, it has been found desirable in one instance to simply add a portion of the combination containing caramel or other similar substance to the dry cement, sand and lime putty mixture followed by adding the usual amount of water.

However, instead of adding 10 gallons of water per sack of cement, it has been found possible to utilize a much smaller quantity of water, say 8 to 9 gallons.

If desired, it is possible to grind the plasticizer containing the caramel with the cement and this appears to form a better quality cement mixture. The more finely divided cement which is produced by grinding in the presence of caramel appears to be of exceptionally high quality and to be of maximum strength when cured and requires a minimum of water to reach its desirable plasticity.

In many instances it is desirable to decrease or omit the amount of lime putty because of the high plasticizing effect of the caramel or similar substance.

In comparing the cement mixtures resulting from the invention of the present application with other cement mixtures, it is found that the workability is much superior with the inclusion of caramel.

For example where a plain cement mixture A of the proportion of cement, lime putty to sand of 1:1:6 was taken and compared with the mixture B containing the plasticizing mixture of the present invention, the following results were obtained:

*Workability*

| | Admixture, gallons | Water, gallons | Water and admixture, gallons | Percentage of water reduction |
|---|---|---|---|---|
| A | | 8.8 | 8.8 | |
| B | ½ | 6.25 | 6.75 | 22.9 |

*Compressive strength after 30 days*

Pounds per square inch*
A ............................................................................. 490
B ............................................................................. 503

*Cubes not cured.

All specimens which were tested had a flow of 120.

The present invention is also of value in connections where it is desired to control the time of set. The inclusion of caramel and the other materials mentioned will give a slow setting mixture. By adding an amount of the set-corrective salt, it is possible to increase the time of set. By limiting the amount of the set-corrective salt, the mixture may be given slow setting properties.

The cement mixture of the present application may be used in oil wells where it is desired to maintain a predetermined consistency while pumping and to prevent premature setting under conditions where relatively high temperatures may be encountered which would ordinarily tend to give rise to difficulties with many other types of cement mixtures. By caramel is meant a colloidal material, the molecular weight of which is much higher than sugar and which for the most part cannot be dialyzed through a diaphragm. Thus, caramel is quite different than sugar in that sugar is generally detrimental to portland cement mixtures, while caramel has the many beneficial effects set forth in the present application.

It is to be understood that the various specific proportions and compound above mentioned have been mentioned by way of illustration and not by way of limitation and that many alternatives, modifications and changes may be made in the above identified procedures and compositions specifically described without departing from the essential features of the present invention, all of which it is intended to cover broadly by the present invention.

What is claimed is:

1. In hydraulic cement mixtures, a water-retaining agent comprising an intermixture of caramel in a proportion of not more than about 1% by weight based upon the hydraulic cement content.

2. In hydraulic cement mixtures, a water-retaining agent comprising an intermixture of at least one of a group of substances comprising caramel, humic acids, and licorice extract in a proportion of not more than about 1% by weight based upon the hydraulic cement content.

3. A hydraulic cement water-retaining agent comprising an intermixture of caramel, water, a set-corrective and a filler.

4. A hydraulic cement water-retaining agent comprising an intermixture of caramel, water, finely divided insoluble inorganic compound and a set corrective.

5. A hydraulic cement water-retaining agent comprising an intermixture of caramel, water, whiting and an alkali earth metal chloride.

6. A hydraulic cement water-retaining agent comprising an intermixture of caramel, water, rosin-ground whiting and calcium chloride.

7. A hydraulic cement water-retaining agent comprising an intermixture of about 200 to 800 parts by weight of whiting, about 10 to 100 parts by weight of caramel and about 50 to 200 parts by weight of calcium chloride.

8. A hydraulic process of increasing the water-retentive properties of cement mixtures, which comprises adding thereto caramel, prepared whiting and calcium chloride in an amount substantially less than 1%.

9. A hydraulic process of increasing the water-retentive properties of cement mixtures, which comprises adding thereto caramel in the amount of 0.1 to 1%.

10. A hydraulic cement mortar having increased water-retentive properties containing between about 0.1 to 1% of caramel.

11. A 1:1:6 hydraulic cement mortar having increased water-retentive properties mixture containing between 1/10 to 1% of caramel, prepared whiting and calcium chloride.

12. A mortar having increased water-retentive properties containing 0.1 to 1% of an aqueous mixture of about 200 to 800 parts by weight of whiting, about 10 to 100 parts by weight of caramel and about 50 to 200 parts by weight of calcium chloride.

FREDERICK WILHELM ALEX OLZE.